(12) United States Patent
Ichinose et al.

(10) Patent No.: US 9,068,047 B2
(45) Date of Patent: Jun. 30, 2015

(54) PROCESS FOR PRODUCING POLY(ARYLENE SULFIDE), AND POLY(ARYLENE SULFIDE) COMPRISING CONTACTING A WASH LIQUID WITH AN ALKALINE COMPOUND

(75) Inventors: Yoshihiro Ichinose, Tokyo (JP); Masanori Kobayashi, Tokyo (JP); Tomoyoshi Koizumi, Tokyo (JP); Mitsuhiro Matsuzaki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 198 days.

(21) Appl. No.: 13/698,600

(22) PCT Filed: Apr. 21, 2011

(86) PCT No.: PCT/JP2011/059800
§ 371 (c)(1),
(2), (4) Date: Nov. 16, 2012

(87) PCT Pub. No.: WO2011/145428
PCT Pub. Date: Nov. 24, 2011

(65) Prior Publication Data
US 2013/0065054 A1    Mar. 14, 2013

(30) Foreign Application Priority Data
May 19, 2010   (JP) .................................. 2010-115163

(51) Int. Cl.
*C08G 75/02* (2006.01)
*C08G 75/14* (2006.01)

(52) U.S. Cl.
CPC ....... *C08G 75/0254* (2013.01); *Y10T 428/2982* (2015.01); *C08G 75/0259* (2013.01); *C08G 75/0281* (2013.01)

(58) Field of Classification Search
CPC .... C08G 75/00; C08G 75/14; C08G 75/0281; C07C 303/42; C07C 309/29; C07C 321/28

USPC .......................................................... 428/402
See application file for complete search history.

(56) References Cited

U.S. PATENT DOCUMENTS

| 4,814,430 | A | 3/1989 | Iwasaki et al. |
| 5,166,446 | A * | 11/1992 | Barentsen et al. ............. 568/56 |
| 6,369,191 | B1 * | 4/2002 | Imai et al. .................... 528/388 |
| 2006/0086374 | A1 | 4/2006 | Sato et al. |
| 2007/0093642 | A1 | 4/2007 | Sato et al. |
| 2007/0161777 | A1 | 7/2007 | Sato et al. |

FOREIGN PATENT DOCUMENTS

| JP | 62-253626 A | 11/1987 |
| JP | 11-349566 A | 12/1999 |
| JP | 2000-191785 A | 7/2000 |
| JP | 2001-354769 A | 12/2001 |
| JP | 2005-194312 A | 7/2005 |
| JP | 2005-225931 A | 8/2005 |
| WO | 2004-060973 A1 | 7/2004 |

\* cited by examiner

*Primary Examiner* — Holly Le
(74) *Attorney, Agent, or Firm* — Birch, Stewart, Kolasch & Birch, LLP

(57) ABSTRACT

Disclosed is a process for producing poly(arylene sulfide) which includes: a polymerization step of polymerizing a dihalogenated aromatic compound and at least one sulfur source selected from the group consisting of alkali metal sulfides and alkali metal hydrogen sulfides in an organic amide solvent, preferably in the presence of a phase separating agent; a separation step of separating a polymer from a reaction liquid containing a produced polymer after the polymerization step; a washing step of washing the polymer with a washing liquid that consists of water and/or an organic solvent; and a separated liquid treatment step of bringing both a separated liquid that has been recovered after the separation of the polymer in the separation step and a separated liquid containing a wash waste liquid that has been recovered after the separation of the polymer in the washing step into contact with an alkaline compound. Also disclosed is poly(arylene sulfide).

12 Claims, No Drawings

PROCESS FOR PRODUCING POLY(ARYLENE SULFIDE), AND POLY(ARYLENE SULFIDE) COMPRISING CONTACTING A WASH LIQUID WITH AN ALKALINE COMPOUND

TECHNICAL FIELD

The present invention relates to a process for producing poly(arylene sulfide) by which occurrence of malodor is reduced upon production and molding and occurrence of malodor from wash waste liquid is reduced.

BACKGROUND ART

Poly(arylene sulfide) (herein below, it may be abbreviated as "PAS") represented by poly(phenylene sulfide) (herein below, it may be abbreviated as "PPS") are engineering plastics excellent in heat resistance, chemical resistance, flame retardancy, mechanical strength, electrical properties, dimensional stability, and the like. The PAS is commonly used in a wide variety of technical fields such as electrical and electronic equipments, automotive equipments, and packaging materials because it can be formed or molded into various kinds of molded or produced products, films, sheets, fibers, etc. by general melt processing techniques such as extrusion molding, injection molding, or compression molding.

As a typical production process of a PAS, the process, in which a sulfur source is reacted with a dihalogenated aromatic compound in an organic amide solvent such as N-methyl-2-pyrrolidone (herein below, it may be abbreviated as "NMP") under heating condition, is known. As the sulfur source, an alkali metal sulfide, an alkali metal hydrogen sulfide, or a mixture thereof is generally used. When an alkali metal hydrogen sulfide is used as the sulfur source, the alkali metal hydrogen sulfide is used in combination with an alkali metal hydroxide.

Since polymerization of PAS is performed at high temperature, a byproduct sulfur compound resulting from a raw material or a product resulting from decomposition of an organic amide solvent used as a reaction solvent may become a cause of malodor.

Thus, after being separated from a reaction liquid containing the polymer thus produced, PAS produced by polymerization is purified by washing with water, an organic solvent, or a mixture liquid of water and the organic solvent. However, even after the washing treatment, there is still a case in which the occurrence of malodor upon production and molding of PAS is not completely inhibited.

Further, a separated liquid containing the organic amide solvent that is obtained after separation of PAS from the reaction liquid containing the polymer produced and also a separated liquid consisting of a wash waste liquid that is obtained after carrying out washing PAS by using the aforementioned organic solvent or the like may contain a byproduct sulfur compound resulting from a raw material or a product resulting from decomposition of an organic amide solvent used as a reaction solvent, or an organic solvent used for the washing as a cause of malodor. Accordingly, an enormous effort is required for a treatment of deodorizing them, and it remains as an obstacle for reusing the organic amide solvent, washing solvent, or the like.

The organic amide solvent, washing solvent and the like are recycled through a common distillation treatment. However, as the cause of malodor cannot be completely removed even after the distillation treatment, occurrence of malodor upon the production and molding of PAS remains unavoidable when PAS is produced by using the recycled organic amide solvent or washing solvent.

Japanese Patent Application Laid-Open (JP-A) No. 2005-194312 (Patent Literature 1, which corresponds to US 2007/0161777 A1 and EP 1702943 A1) discloses a process for producing PAS including washing the PAS obtained by polymerization with a hydrophilic organic solvent such as acetone containing water in an amount of 1 to 30% by mass to have a nitrogen content of 50 ppm or less based on the mass of the polymer, by which adhesion onto a mold or a die is significantly reduced upon melt molding. JP-A No. 2005-225931 (Patent Literature 2, which corresponds to US 2007/0093642 A1 and EP 1714994 A1) discloses a process for producing PAS with high whiteness and excellent melt stability including washing the polymer produced in a polymerization step repeatedly with a washing liquid consisting of water, a hydrophilic organic solvent such as acetone or a mixture solvent thereof, washing it in a final step with water or the mixture liquid to control the washing condition such that pH of the washing liquid obtained after washing is in the range of 8.0 to 11.0, and removing an organic amide solvent, alkali metal halides, oligomers, and decomposition products adhered onto PAS after separation treatment. Meanwhile, WO 2004/060973 A1 (Patent Literature 3, which corresponds to US 2006/0086374 A1 and EP 1577337 A1) discloses a process for producing PAS including washing the polymer separated from the reaction liquid with an organic solvent such as acetone and then distilling the recovered organic solvent after adding an inorganic acid such as hydrochloric acid to reduce the content of an alkali compound like methyl amine, that is presumed to be derived from decomposition of an organic amide solvent.

All the inventions disclosed in Patent Documents 1 to 3, however, did not succeed in inhibiting completely an occurrence of malodor during production and molding at high temperature such as melt molding of PAS. Further, all the inventions disclosed in Patent Documents 1 to 3 cannot avoid an enormous effort required for a deodorizing treatment of a byproduct sulfur compound of a raw material for causing malodor, which is contained in a liquid containing an organic amide solvent obtained after separation of PAS from the reaction liquid or a wash waste liquid obtained after washing PAS with an organic solvent, an organic amide solvent as a reaction solvent, or a decomposed product of an organic solvent used for the washing.

CITATION LIST

Patent Literature

Patent Literature 1: JP-A No. 2005-194312
Patent Literature 2: JP-A No. 2005-225931
Patent Literature 3: WO 2004/060973 A1

SUMMARY OF INVENTION

Technical Problem

The object of the present invention is to provide a process for producing PAS by which malodor is reduced during PAS production and occurrence of malodor during molding of PAS is reduced even when an organic solvent, an organic amide solvent, or the like is re-used, based on the reduction of the malodor from the separated liquid containing an organic amide solvent or the like after separating PAS or the reduction of the malodor from the wash waste liquid obtained after washing the PAS with an organic solvent or water.

SOLUTION TO PROBLEM

As a result of intensive studies to solve the problems described above, the inventors of the present invention found that a reaction product of the hydrogen sulfide, which is produced during polymerization reaction with impurities or a byproduct originating from an organic solvent, in wash waste liquid is a cause of the malodor which is occurred or remained during production of PAS or washing and recovering of PAS using an organic solvent. Accordingly, the inventors found that malodor of the wash waste liquid and malodor occurring upon production of PAS or molding of PAS at high temperature can be reduced by a treatment including contacting the separated liquid containing the wash waste liquid with an alkaline compound.

Specifically, as PAS is generally produced by a polymerization reaction under strong alkaline condition, the polymer separated liquid which is obtained after separating the produced polymer is alkaline and also the separated liquid consisting of wash waste liquid which is obtained after separating the polymer by washing the separated PAS is alkaline. Further, the organic solvent used for washing may produce various byproducts under an alkaline condition. For such reasons, the impurities originating from the organic solvent may be contained in the wash waste liquid.

Meanwhile, since the production of PAS is based on the reaction of at least one sulfur source selected from the group consisting of alkali metal sulfides and alkali metal hydrogen sulfides with a dihalogenated aromatic compound generally at high temperature, various sulfur compounds are produced as a byproduct and examples of the byproduct sulfur compound include hydrogen sulfide. Thus, hydrogen sulfide is remained in wash waste liquid or polymer separated liquid.

Based on the findings described above, the inventors of the present invention conducted further studies, and as a result found that various malodor-causing substances having much stronger malodor are yielded and accumulated in accordance with a reaction between hydrogen sulfide and impurities originating from an organic solvent, and they serve as a cause of malodor of PAS and a cause of malodor of separated liquid.

Accordingly, in view of the finding that hydrogen sulfide present in separated liquid needs to be removed to prevent an occurrence of a causative substance of malodor as a malodor component, the inventors conducted further studies and, as a result, achieved to provide a process for producing poly (arylene sulfide) including a separated liquid treatment step of bringing wash waste liquid obtained after the separation of the polymer in the washing step or a separated liquid containing the polymer separated liquid obtained after the separation of the polymer in the separating step into contact with an alkaline compound.

Thus, according to the present invention, provided is a process for producing poly(arylene sulfide), the process comprising: a polymerization step of polymerizing a dihalogenated aromatic compound and at least one sulfur source selected from the group consisting of alkali metal sulfides and alkali metal hydrogen sulfides in an organic amide solvent to produce a polymer; a separation step of separating and recovering polymer from a reaction liquid containing the produced polymer after the polymerization step; a washing step of washing the recovered polymer with at least one washing liquid selected from the group consisting of water, an organic solvent, and a mixture solution of water and an organic solvent; and a separated liquid treatment step of bringing a separated liquid containing a wash waste liquid obtained after separating the polymer in the washing step into contact with an alkaline compound.

According to the invention, the following embodiments are provided.

(1) The process for producing poly(arylene sulfide), wherein the separated liquid further comprises a polymer separated liquid obtained after separating the polymer in the separation step.

(2) The process for producing poly(arylene sulfide), wherein the alkaline compound is alkali metal hydroxide, preferably sodium hydroxide.

(3) The process for producing poly(arylene sulfide), wherein the amount of the alkaline compound used is 0.001 to 10 parts by mass per 100 parts by mass of the separated liquid.

(4) The process for producing poly(arylene sulfide), wherein the organic solvent comprises acetone.

(5) The process for producing poly(arylene sulfide), wherein the polymerization step is a polymerization reaction of at least one sulfur source selected from the group consisting of the alkali metal sulfides and the alkali metal hydrogen sulfides with the dihalogenated aromatic compound in the organic amide solvent at the temperature of 170 to 290° C. in the presence of a phase separating agent.

(6) The process for producing poly(arylene sulfide), wherein the polymerization step is a polymerization reaction of at least one sulfur source selected from the group consisting of the alkali metal sulfides and the alkali metal hydrogen sulfides with the dihalogenated aromatic compound in the organic amide solvent at the temperature of 170 to 270° C., and at the point of time, in which the conversion rate of the dihalogenated aromatic compound has reached 30% or more, the phase separating agent is included in the polymerization reaction system and the polymerization reaction is further continued at the temperature of 245 to 290° C.

(7) The process for producing poly(arylene sulfide), wherein the polymerization step is a polymerization process with at least two stages which comprises: first-stage polymerization step by which at least one sulfur source selected from the group consisting of the alkali metal sulfides and the alkali metal hydrogen sulfides is subjected to the polymerization reaction with the dihalogenated aromatic compound in the organic amide solvent to produce a polymer in which conversion rate of the dihalogenated aromatic compound is 80 to 99%; and second-stage polymerization step by which the polymerization reaction is continued in a phase-separated state, wherein a concentrated phase of the produced polymer and a dilute phase of the produced polymer are co-present as a mixture, in the presence of a phase separating agent in the polymerization reaction system.

(8) The process for producing poly(arylene sulfide), wherein the polymerization step is a polymerization process with at least two stages which comprises: first-stage polymerization step by which at least one sulfur source selected from the group consisting of the alkali metal sulfides and the alkali metal hydrogen sulfides is subjected to the polymerization reaction with the dihalogenated aromatic compound in the organic amide solvent at the temperature of 170 to 270° C. in the presence of water in an amount of 0.02 to 2.0 mol per 1 mol of the charged sulfur source to produce a polymer in which conversion rate of the dihalogenated aromatic compound is 80 to 99%; and second-stage polymerization step by which water content in the polymerization reaction system is controlled such that water is present in an amount of greater than 2.0 mol and 10 mol or less per 1 mol of the charged sulfur source and at the temperature of 245 to 290° C., the polymerization reaction is continued in a phase-separated state, wherein a concentrated phase of the produced polymer and a dilute phase of the produced polymer are co-present as a mixture in the polymerization reaction system.

(9) The process for producing poly(arylene sulfide), wherein in the second-stage polymerization step, water content in the polymerization reaction system is controlled such that water is present in an amount of greater than 2.0 mol and 10 mol or less per 1 mol of the charged sulfur source and at least one phase separating agent that is selected from the group consisting of metal salts of organic carboxylic acids, metal salts of organic sulfonic acids, alkali metal halides such as lithium halide, alkali earth metal halides, alkali earth metal salts of aromatic carboxylic acid, alkali metal salts of phosphoric acid, alcohols, and paraffinic hydrocarbons is included in a range of 0.01 to 3 mol per 1 mol of the charged sulfur source.

(10) The process for producing poly(arylene sulfide), wherein, prior to the polymerization step, are arranged the process including: dehydration step by which a mixture including the organic amide solvent, the sulfur source containing the alkali metal hydrogen sulfide, and alkali metal hydroxide in an amount of 0.95 to 1.05 mol per 1 mol of the alkali metal hydrogen sulfide is reacted by heating and at least part of distillation extract containing water is discharged from inside of the system including the mixture to outside of the system; and charging step by which the alkali metal hydroxide and water are added, if necessary, to the mixture remained in the system after the dehydration step such that total mol number including the mol number of the alkali metal hydroxide that is produced in conjunction with hydrogen sulfide produced by dehydration, the mol number of the alkali metal hydroxide that is added before the dehydration, and the mol number of the alkali metal hydroxide that is added after the dehydration is 1.00 to 1.09 mol per 1 mol of the charged sulfur source and the mol number of water is 0.02 to 2.0 mol per 1 mol of the charged sulfur source.

(11) The process for producing poly(arylene sulfide), wherein the phase separating agent is more preferably at least one selected from the group consisting of water, metal salts of organic carboxylic acids, metal salts of organic sulfonic acids, alkali metal halides, alkali earth metal halides, alkali earth metal salts of aromatic carboxylic acid, alkali metal salts of phosphoric acid, alcohols, and paraffinic hydrocarbons.

(12) The process for producing poly(arylene sulfide), wherein the phase separating agent is more preferably 0.5 to 10 mol of water and 0.001 to 0.7 mol of metal salts of organic carboxylic acid per 1 mol of the charged sulfur source.

Also provided by the invention is poly(arylene sulfide) that is produced by the process for producing poly(arylene sulfide) described above and particulate poly(arylene sulfide) with average particle diameter in the range of 50 to 2,000 μm and specific surface area in the range of 0.1 to 500 $m^2/g$, in which the specific surface area is measured by nitrogen adsorption-based BET method.

Advantages Effects of Invention

According to the invention, malodor from wash waste liquid obtained after separation of a polymer in the washing step or malodor from separated liquid which contains polymer separated liquid obtained after separation of a polymer in the separation step is reduced, and as a result, a process for producing poly(arylene sulfide) by which malodor is reduced during PAS production and occurrence of malodor during molding of PAS is reduced even when an organic solvent, an organic amide solvent, or the like that is contained in the wash waste liquid or separated liquid is re-used is provided.

According to the process for producing poly(arylene sulfide) of the invention, a causative substance of malodor which remains or occurs during separation and recovery of PAS from a reaction liquid containing the produced polymer and washing and recovering of PAS after the separation is removed, and therefore, malodor upon production of PAS or molding of PAS at high temperature can be reduced. As a result, the PAS obtained by the production process of the invention is suitable for application of a general melt process such as extrusion molding, injection molding, and compression molding and it can be desirably used for a broad range including electric and electronic equipments and automobile equipments as well as a sealing agent or a coating agent for an electric component.

In addition, according to the process for production of poly(arylene sulfide) of the invention, malodor from the polymer separated liquid obtained after separating PAS from the reaction liquid containing the produced polymer or malodor from the wash waste liquid obtained after washing PAS with an organic solvent or water is reduced, and therefore without requiring a long time needed for a deodorizing treatment, reuse of an organic amide solvent or an organic solvent is promoted and thus it can contribute to resolving problems associated with resources and environment.

DESCRIPTION OF EMBODIMENTS

1. Sulfur Source

In the present invention, at least one selected from the group consisting of an alkali metal sulfide and an alkali metal hydrogen sulfide is used as a sulfur source. An example of the alkali metal sulfide may include lithium sulfide, sodium sulfide, potassium sulfide, rubidium sulfide, cesium sulfide, and mixtures of two or more compounds thereof. An example of the alkali metal hydrogen sulfide may include lithium hydrogen sulfide, sodium hydrogen sulfide, potassium hydrogen sulfide, rubidium hydrogen sulfide, cesium hydrogen sulfide and mixtures of two or more compounds thereof.

The alkali metal sulfide may be used in any form of an anhydride, a hydrate, and an aqueous solution. Among these, sodium sulfide and lithium sulfide are preferred in that they are industrially available at a low price. The alkali metal sulfide is preferably used as an aqueous mixture (that is, a fluid mixture with water) such as an aqueous solution from the viewpoints of processing operation, metering, or the like.

The alkali metal hydrogen sulfide may be used in any form of an anhydride, a hydrate, and an aqueous solution. Among these, sodium hydrogen sulfide and lithium hydrogen sulfide are preferred in that they are industrially available at a low price. The alkali metal hydrogen sulfide is preferably used as an aqueous solution and an aqueous mixture (that is, a fluid mixture with water) from the viewpoints of processing operation, metering, or the like.

A small amount of an alkali metal hydrogen sulfide may be contained in the alkali metal sulfide that is used for the invention. In this case, the total molar quantity of the alkali metal sulfide and alkali metal hydrogen sulfide becomes a sulfur source which is supplied to the polymerization reaction, that is, "charged sulfur source".

A small amount of the alkali metal sulfide may be contained in the alkali metal hydrogen sulfide that is used for the invention. In this case, the total molar quantity of the alkali metal hydrogen sulfide and alkali metal sulfide becomes a charged sulfur source. When a mixture of the alkali metal sulfide and the alkali metal hydrogen sulfide is used, the mixture in which both are present becomes the charged sulfur source.

When the sulfur source contains alkali metal hydrogen sulfide, it is preferable to use an alkali metal hydroxide in combination. Examples of the alkali metal hydroxide include lithium hydroxide, sodium hydroxide, potassium hydroxide, rubidium hydroxide, cesium hydroxide, and mixtures of two or more compounds thereof. Among these, sodium hydroxide and lithium hydroxide are preferred in that they are industrially available at low price. The alkali metal hydroxide is preferably used as an aqueous solution or an aqueous mixture.

In the production process according to the present invention, the water to be dehydrated in the dehydration step includes water of hydration, a water medium of an aqueous solution, and water secondarily produced in a reaction of the alkali metal hydrogen sulfide with the alkali metal hydroxide.

2. Dihalogenated Aromatic Compound

The dihalogenated aromatic compound used in the present invention is a dihalogenated aromatic compound having two halogen atoms directly bonded to the aromatic ring. The halogen atom means each of fluorine, chlorine, bromine, and iodine atoms, and two halogen atoms in the same dihalogenated aromatic compound may be the same or different from each other. These dihalogenated aromatic compounds may be used either singly or in any combination of two or more.

Specific examples of the dihalogenated aromatic compound include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. Of these, p-dihalobenzene, m-dihalobenzene, and a mixture of them are preferable. p-dihalobenzene is more preferable. p-dichlorobenzene is particularly preferable.

The charged amount of the dihalogenated aromatic compound used for the polymerization reaction is generally 0.90 to 1.50 mol, preferably 1.00 to 1.10 mol, more preferably 1.00 to 1.09 mol, and particularly preferably greater than 1.00 mol and 1.09 mol or less per 1 mol of the sulfur source (herein below, it is described as the "charged sulfur source", and herein it represents alkali metal sulfide and/or alkali metal hydrogen sulfide) present at the beginning of the polymerization reaction of the polymerization step, that is, in the charge step after dehydration step, which is arranged if required. In most cases, favorable results can be obtained when the charged amount of the dihalogenated aromatic compound is in the range of from 1.01 to 1.09 mol. If the charged molar ratio of the dihalogenated aromatic compound relative to the sulfur source is excessively high, it is difficult to produce PAS with high molecular weight. On the other hand, if the charged molar ratio of the dihalogenated aromatic compound relative to the sulfur source is excessively low, a decomposition reaction easily occurs, making it difficult to perform a stable polymerization reaction.

3. Branching and Cross-Linking Agent and Molecular Weight Modifier

In order to introduce a branched or cross-linked structure to the produced PAS, a polyhalogenated compound (may not be always an aromatic compound), to which at least 3 halogen atoms are bonded, an active hydrogen-containing halogenated aromatic compound, and a halogenated aromatic nitro compound may also be used in combination. Preferable examples of the polyhalogenated compound as a branching and cross-linking agent include trihalobenzenes such as trichlorobenzene. Further, in order to form a terminal of a specific structure in a PAS resin produced or modify a polymerization reaction or a molecular weight, a monohalogenated compound may be used in combination. As a monohalogenated compound, not only a monohalogenated aromatic compound but also a monohalogenated aliphatic compound may be used.

4. Organic Amide Solvent

In the invention, an organic amide solvent that is an aprotic polar organic solvent is used as a solvent for the dehydration reaction and polymerization reaction. The organic amide solvent is preferably stable to an alkali at a high temperature. Specific examples of the organic amide solvent include amide compounds such as N,N-dimethyl formamide and N,N-dimethyl acetamide; N-alkyl caprolactam compounds such as N-methyl-ε-caprolactam; N-alkyl pyrrolidone compounds or N-cycloalkyl pyrrolidone compounds such as N-methyl-2-pyrrolidone and N-cyclohexyl-2-pyrrolidone; N,N-dialkyl imidazolidinone compounds such as 1,3-dialkyl-2-imidazolidinone; tetraalkylurea compounds such as tetramethylurea; and hexaalkyl phosphoric triamide compounds such as hexamethylphosphoric triamide. These organic amide solvents may be used either singly or in any combination of two or more.

Among these organic amide solvents, N-alkyl pyrrolidone compounds, N-cycloalkyl pyrrolidone compounds, N-alkyl caprolactam compounds, and N,N-dialkyl imidazolidinone compounds are preferred, and N-methyl-2-pyrrolidone (herein below, referred to as "NMP"), N-methyl-ε-caprolactam, and 1,3-dialkyl-2-imidazolidinone are particularly preferably used. The amount of the organic amide solvent used in the polymerization reaction of the present invention is generally within a range of 0.1 to 10 kg per 1 mol of the sulfur source.

5. Polymerization Aid

According to the invention, in order to promote the polymerization reaction, various kinds of polymerization aids may be used as needed. Specific examples of the polymerization aids include water, metal salts of organic carboxylic acids, metal salts of organic sulfonic acids, alkali metal halides such as lithium halide, alkali earth metal halides, alkali earth metal salts of aromatic carboxylic acid, alkali metal salts of phosphoric acid, alcohols, paraffinic hydrocarbons, which are generally known as polymerization aids for PAS, and a mixture of two or more of them. Preferable examples of the metal salts of organic carboxylic acids include the alkali metal salts of carboxylic acids. Examples of the alkali metal salts of carboxylic acid include lithium acetate, sodium acetate, potassium acetate, sodium propionate, lithium valerate, lithium benzoate, sodium benzoate, sodium phenyl acetate, potassium p-toluoylate, and a mixture of two or more of them. Sodium acetate is particularly preferable in that it is readily available at a low price as the alkali metal salts of carboxylic acid. The amount of the polymerization aid used varies according to the kind of the compound. However, it is generally within a range of 0.01 to 10 mol, preferably 0.1 to 2 mol, more preferably 0.2 to 1.8 mol, and particularly preferably 0.3 to 1.7 mol per 1 mol of the charged sulfur source. When the polymerization aid is metal salts of organic sulfonic acid, salts of organic carboxylic acid, or alkali metal halides, the upper limit of the use amount is preferably 1 mol or less and more preferably 0.8 mol or less per 1 mol of the charged sulfur source.

6. Phase Separating Agent

According to the invention, it is preferable to use various phase separating agents to promote the polymerization reaction so that PAS with high polymerization degree can be obtained within a short time. The phase separating agent indicates a compound which is dissolved in an organic amide solvent either by itself or in the presence of a small amount of water to have an activity of lowering the solubility of PAS in an organic amide solvent. The phase separating agent is a compound which by itself is not a solvent for PAS.

As the phase separating agent, a compound, which is generally known in this technical field of PAS to function as a phase separating agent, may be used. The compound used as a polymerization aid is also included in the phase separating agent. However, the phase separating agent as used herein indicates a compound used in an amount ratio which allows the function as a phase separating agent during the phase separating polymerization step. Specific examples of the phase separating agent include water, metal salts of organic carboxylic acids, metal salts of organic sulfonic acids, alkali metal halides such as lithium halide, alkali earth metal halides, alkali earth metal salts of aromatic carboxylic acid, alkali metal salts of phosphoric acid, alcohols, and paraffinic hydrocarbons. Preferable examples of the metal salts of organic carboxylic acids include the alkali metal salts of carboxylic acids like lithium acetate, sodium acetate, potassium acetate, sodium propionate, lithium valerate, lithium benzoate, sodium benzoate, sodium phenyl acetate, and potassium p-toluoylate. The phase separating agent may be used either singly or in combination of two or more of them. Among the phase separating agents, water or a combination of water and metal salts of organic carboxylic acid such as alkali metal salts of carboxylic acid is particular preferable in that it is available at a low price and can be easily applicable for a post-treatment.

The amount of the phase separating agent used varies according to the kind of the compound used. However, it is generally within a range of 0.01 to 10 mol, preferably 0.01 to 9.5 mole, and more preferably 0.02 to 9 mol per 1 mol of the charged sulfur source. When the phase separating agent is less than 0.01 mol or greater than 10 mol per 1 mol of the charged sulfur source, the phase separation state cannot be obtained at sufficient level, and therefore PAS with high polymerization degree cannot be yielded.

When the production process of the invention includes a polymerization step including adding a phase separating agent and carrying out the polymerization in the presence of the phase separating agent, it is desirable that the amount of water is controlled such that water is present in the polymerization reaction system at the ratio of greater than 2.0 mol and 10 mol or less, preferably 2.2 mol to 7 mol, and more preferably 2.5 mol to 5 mol per 1 mol of the charged sulfur source. It is also desirable that the phase separating agent other than water, for example, metal salts of organic carboxylic acid described above, is used within a range of preferably 0.01 to 3 mol, more preferably 0.02 to 2 mol, and particularly preferably 0.03 to 1 mol per 1 mol of the charged sulfur source.

Even for a case in which water is used as a phase separating agent, a phase separating agent other than water may be used in combination as a polymerization aid from the viewpoint of obtaining effective phase separating polymerization. When a phase separating agent other than water is used in combination for the phase separating polymerization step, it may have the total amount which enables the phase separation. During the phase separating polymerization step, in addition to have water present in the polymerization reaction system at the ratio of greater than 2.0 mol and 10 mol or less, preferably 2.2 mol to 7 mol, and more preferably 2.5 mol to 5 mol per 1 mol of the charged sulfur source, it is possible to use other phase separating agent in combination in the range of preferably 0.01 to 3 mol, more preferably 0.02 to 2 mol, and particularly preferably 0.03 to 1 mol. For a case in which water is used in combination with other phase separating agent, in order to carry out the phase separating polymerization with a small amount of a phase separating agent, other phase separating agent such as metal salts of organic carboxylic acid, more preferably metal salts of organic carboxylic acid, and particularly preferably alkali metal salts of carboxylic acid may be used in combination within a range of 0.001 to 0.7 mol, preferably 0.02 to 0.6 mol, and particularly preferably 0.05 to 0.5 mol in addition to the use of water within a range of 0.5 to 10 mol, more preferably 0.6 to 7 mol, and particularly preferably 0.8 to 5 mol per 1 mol of the charged sulfur source.

It is possible that at least part of the phase separating agent is present from the beginning of charging the reactants for the polymerization reaction. However, it is preferable that the phase separating agent is added during the polymerization reaction, so that it can be controlled to an amount sufficient for forming the phase separation.

7. Dehydration Step

A dehydration step is preferably arranged as a preliminary step for a polymerization step to control the amount of water in the reaction system. The dehydration step is performed by a process including heating and reacting a mixture containing the organic amide solvent and the alkali metal sulfides, desirably, under an inert gas atmosphere and discharging water outside the system by distillation. When the alkali metal hydrogen sulfide is used as a sulfur source, it is performed by a process including heating and reacting a mixture containing the alkali metal hydrogen sulfides and alkali metal hydroxides and discharging water outside the system by distillation.

In the dehydration step, the dehydration is conducted until the content of water containing water of hydration (water of crystallization), a water medium, secondarily produced water, or the like becomes the desired amount in a range of necessary amounts. In the dehydration step, the dehydration is conducted until the water content co-existed in the polymerization reaction system becomes generally 0.02 to 2.0 mol, preferably 0.05 to 1.8 mol, and more preferably 0.5 to 1.6 mol per 1 mol of the charged sulfur source. As described before, the sulfur source obtained after the dehydration step is referred to as a "charged sulfur source". When the water content has become too low in the dehydration step, water may be added prior to the polymerization step to adjust the water content to a desired value.

For a case in which alkali metal hydrogen sulfide is used as a sulfur source, it is preferred that in the dehydration step, a mixture containing the organic amide solvent, the alkali metal hydrogen sulfide, and the alkali metal hydroxide in a proportion of 0.95 to 1.05 mol per 1 mol of the alkali metal hydrogen sulfide is heated to cause a reaction between them and to discharge at least a part of a distillate containing water from the inside of the system containing the mixture to the outside of the system.

If a molar ratio of the alkali metal hydroxide to 1 mol of the alkali metal hydrogen sulfide in the dehydration step is too low, the amount of a sulfur component (hydrogen sulfide) volatilized off in the dehydration step becomes excessively high, which tends to incur reduction in productivity due to lowering of the amount of the sulfur source or cause abnormal reactions and deterioration of a produced PAS quality due to increase of a polysulfide component in the charged sulfur source remained after the dehydration. If the molar ratio of the alkali metal hydroxide to 1 mol of the alkali metal hydrogen sulfide is too high, change in properties of the organic amide solvent may be increased, and thus difficulty may be encountered on stably performing the polymerization reaction, or the yield or quality of a produced PAS may be deteriorated. A preferable molar ratio of the alkali metal hydroxide to 1 mol of the alkali metal hydrogen sulfide in the dehydration step is 0.97 to 1.04, and more preferably 0.98 to 1.03.

In many cases, a small amount of an alkali metal sulfide is contained in an alkali metal hydrogen sulfide, so that the amount of the sulfur source involves a total amount of the alkali metal hydrogen sulfide and the alkali metal sulfide. Further, even when a small amount of the alkali metal sulfide is mixed in, the molar ratio to the alkali metal hydroxide may be calculated out on the basis of the content (analytical value) of the alkali metal hydrogen sulfide to control the molar ratio according to the invention.

For the dehydration step, the charging of these raw materials into a reaction vessel is generally conducted within a temperature range of from room temperature (5 to 35° C.) to 300° C., and preferably from room temperature to 200° C. The charging of the raw materials may be in any order, and the respective raw materials may be additionally charged in the course of the dehydration process. An organic amide solvent is used as a solvent used in the dehydration step. This solvent is preferably the same as the organic amide solvent used in the polymerization step, and NMP is particularly preferred. The amount of the organic amide solvent used is generally of the order of 0.1 to 10 kg per 1 mol of the sulfur source charged in the reaction vessel.

The dehydration process is conducted by heating the mixture after charging the raw materials into the reaction vessel in a temperature range of generally 300° C. or less, preferably 100 to 250° C. for generally 15 minutes to 24 hours, preferably 30 minutes to 10 hours. Heating methods include a method of retaining a fixed temperature, a method of raising the temperature either stepwise or continuously, or a method of combining both methods. The dehydration step is conducted by a batch system, a continuous system, or a combined system of both systems.

An apparatus for conducting the dehydration step may be the same as a reaction vessel (reaction can) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

8. Charging Step

In the present invention, it is possible that an alkali metal hydroxide and water are added to the mixture remained in the system after the dehydration step, as needed. In particular, for a case in which an alkali metal hydrogen sulfide is used as a sulfur source, it is preferable that they are adjusted such that the total mol number including the mol number of alkali metal hydroxide that is produced in conjunction with hydrogen sulfide generated by dehydration, the mol number of alkali metal hydroxide that is added before the dehydration, and the mol number of alkali metal hydroxide that is added after the dehydration is preferably 1.00 to 1.09 mol, and more preferably greater than 1.00 mol and 1.09 mol or less per 1 mol of the sulfur source that is present within the system after the dehydration, that is, charged sulfur source, and the mol number of water is 0.02 to 2.0 mol, preferably 0.05 to 1.8 mol, and more preferably 0.5 to 1.6 mol per 1 mol of the charged sulfur source. Here, the amount of the charged sulfur source is calculated out in accordance with an equation, [Charged sulfur source]=[Total mol of sulfur charged]−[Mol of sulfur volatilized off after dehydration].

When hydrogen sulfide is volatilized off in the dehydration step, an alkali metal hydroxide is produced by an equilibrium reaction and comes to remain in the system. Accordingly, it is necessary to exactly grasp the amount of hydrogen sulfide volatilized to determine a molar ratio of the alkali metal hydroxide to the sulfur source in the charging step.

If the molar ratio of the alkali metal hydroxide to 1 mol of the charged sulfur source is too high, change in properties of the organic amide solvent may be increased, or abnormal reactions or decomposition reactions may be caused upon polymerization. In addition, if this molar ratio is too high, the lowering of the yield and quality of a produced PAS is often caused. The molar ratio of the alkali metal hydroxide to 1 mol of the charged sulfur source is preferably 1.005 to 1.085 mol, more preferably 1.01 to 1.08 mol, and particularly preferably 1.015 to 1.075 mol. It is preferred to conduct the polymerization reaction slightly in excess of the alkali metal hydroxide in that the polymerization reaction is stably performed to give a high-quality PAS.

In the present invention, a sulfur source in a charging step is referred to as "a charged sulfur source" for distinguishing it from a sulfur source used in a dehydration step. The reason for it is that the amount of the sulfur source charged into the reaction vessel in the dehydration step is varied by a dehydration step. The charged sulfur source is consumed by a reaction with a dihalogenated aromatic compound in a polymerization step. However, molar amount of the charged sulfur source is based on the molar amount in the charging step.

9. Polymerization Step

The polymerization step is conducted by charging a dihalogenated aromatic compound into the mixture obtained after completion of the dehydration step and heating the sulfur source and the dihalogenated aromatic compound in the organic amide solvent. When a different polymerization vessel from the reaction vessel used in the dehydration step is used, the mixture obtained after the dehydration step and the dihalogenated aromatic compound are charged into the polymerization vessel. After the dehydration step and before the polymerization step, the amounts of the organic amide solvent and coexisting water may be controlled as needed. Further, before the polymerization step or during the polymerization step, a polymerization aid and other additives may be mixed.

The mixing of the mixture obtained after completion of the dehydration step with the dihalogenated aromatic compound is conducted within a temperature range of generally from 100 to 350° C., and preferably from 120 to 330° C. When the respective components are charged into the polymerization vessel, no particular limitation is imposed on the order of charging. Examples of a charging method include a method of partially charging both components in small portions and a method of charging both components at a time.

In general, the polymerization reaction is conducted by heating the charged mixture at a temperature ranging generally from 170 to 290° C., preferably 180 to 280° C., and more preferably 190 to 275° C. to initiate the polymerization reaction and allowing the reaction to occur. As a heating method, a method of retaining a fixed temperature, a method of raising the temperature either stepwise or continuously, or a combination of both methods is used. The polymerization reaction time is within a range of generally from 10 minutes to 72 hours, and desirably from 30 minutes to 48 hours. The polymerization reaction is preferably conducted in the polymerization step by two stage polymerization process including the first-stage polymerization step and the second-stage polymerization step. For such two-step process, the polymerization time is the total time for the first-stage polymerization step and the second-stage polymerization step.

The amount of the organic amide solvent used in the polymerization step is within a range of generally from 0.1 to 10 kg, and preferably from 0.15 to 5 kg per 1 mol of the charged sulfur source existing in the polymerization step. The amount may be changed in the course of the polymerization reaction so far as it falls within this range. The water content co-existed upon the beginning of the polymerization reaction is desirably controlled within a range of generally 0.02 to 2.0 mol, preferably 0.05 to 1.8 mol, and more preferably 0.5 to 1.6 mol per 1 mol of the charged sulfur source. It is preferable to increase the water content co-existed in the course of the polymerization reaction.

According to the process for producing PAS described in the present invention, as a polymerization step, it is preferable that at least one sulfur source selected from the group consisting of alkali metal sulfides and alkali metal hydrogen sulfides is subjected to the polymerization reaction with a dihalogenated aromatic compound in an organic amide solvent at the temperature of 170 to 290° C. in the presence of a phase separating agent. As a phase separating agent, the compounds described above are preferably used.

According to the process for producing PAS described in the present invention, it is more preferable that as a polymerization step, at least one sulfur source selected from the group consisting of alkali metal sulfides and alkali metal hydrogen sulfides is subjected to the polymerization reaction with a dihalogenated aromatic compound in an organic amide solvent at the temperature of 170 to 270° C., and at the point of time, of which the conversion rate of the dihalogenated aromatic compound has reached 30% or more, the phase separating agent is added to have the phase separating agent present in the polymerization reaction system followed by increasing the temperature of the mixture of polymerization reaction, and the polymerization reaction is further continued at the temperature of 245 to 290° C. in the presence of a phase separating agent.

According to the process for producing PAS described in the present invention, it is still more preferable that as a polymerization step, the polymerization reaction is performed with at least two stage polymerization process which includes the first-stage polymerization step by which at least one sulfur source selected from the group consisting of alkali metal sulfides and alkali metal hydrogen sulfides is subjected to the polymerization reaction with a dihalogenated aromatic compound in an organic amide solvent to produce a polymer in which conversion rate of the dihalogenated aromatic compound is 80 to 99%; and the second-stage polymerization step by which the polymerization reaction is continued in a phase-separated state, in which a concentrated phase of the produced polymer and a dilute phase of the produced polymer are co-present as a mixture in the polymerization reaction system in which a phase separating agent is present.

According to the process for producing PAS described in the present invention, it is particularly preferable that as a polymerization step, the polymerization reaction is performed with at least two stage polymerization process which includes the first-stage polymerization step by which at least one sulfur source selected from the group consisting of alkali metal sulfides and alkali metal hydrogen sulfides is subjected to the polymerization reaction with a dihalogenated aromatic compound in an organic amide solvent at the temperature of 170 to 270° C. in the presence of water in an amount of 0.02 to 2.0 mol per 1 mol of the charged sulfur source to produce a polymer in which conversion rate of the dihalogenated aromatic compound is 80 to 99%; and the second-stage polymerization step by which water content in the polymerization reaction system is controlled such that water is present in an amount of greater than 2.0 mol and 10 mol or less per 1 mol of the charged sulfur source, the temperature is subsequently raised to 245 to 290° C., and the polymerization reaction is continued in a phase-separated state, in which a concentrated phase of the produced polymer and a dilute phase of the produced polymer are co-present as a mixture, in the polymerization reaction system.

As described above, the first-stage polymerization step indicates a step at which, after starting the polymerization reaction, conversion rate of the dihalogenated aromatic compound reaches 80 to 99%, preferably 85 to 98%, and still more preferably 90 to 97%. If the polymerization temperature in the first-stage polymerization step is too high, side reactions or decomposition reactions is easy to occur.

The conversion rate of the dihalogenated aromatic compound indicates the value which is calculated in accordance with the following equation. When the dihalogenated aromatic compound (herein below, may be also abbreviated as "DHA") is added in excess in terms of a molar ratio to the sulfur source, the conversion rate is calculated out in accordance with the following equation:

Conversion rate=[(Charged amount (mol) of DHA)−(Remaining amount (mol) of DHA)]/[(Charged amount (mol) of DHA)−Excessive amount of DHA (mol)]×100.

For a case other than that, the conversion rate is calculated out in accordance with the following equation:

Conversion rate=[(Charged amount (mol) of DHA)−(Remaining amount (mol) of DHA)]/[(Charged amount (mol) of DHA)]×100.

The amount of water coexisted in the reaction system in the first-stage polymerization step is generally in the range of 0.02 to 2.0 mol, preferably 0.05 to 1.8 mol, more preferably 0.5 to 1.6 mol, and particularly preferably 0.8 to 1.5 mol per 1 mol of the charged sulfur source. Although only a small amount of the water may coexist in the first-stage polymerization step, when it is excessively small, a undesirable reaction such as decomposition of produced PAS may easily occur. When the amount of the coexisted water is greater than 2.0 mol, the polymerization rate may be significantly reduced or decomposition of an organic amide solvent or produced PAS may easily occur, and therefore also undesirable. The polymerization is carried out within a temperature range of 170 to 270° C., and preferably 180 to 265° C. If the polymerization temperature is too low, the polymerization rate is excessively slow. On the other hand, if it is high temperature such as greater than 270° C., decomposition of the produced PAS and organic amide solvent may easily occur, and thus the polymerization degree of the produced PAS is significantly low.

In the first-stage polymerization step, it is desirable to form a polymer (herein below, it may be referred to as a "prepolymer") generally having a melt viscosity of 0.5 to 30 Pa·s as measured at a temperature of 310° C. and a shear rate of 1,216 sec$^{-1}$.

The second-stage polymerization step of the invention is not a simple selection and granulating process for the polymer (prepolymer) which has been produced in the first-stage polymerization step. Instead, it is a step for increasing the polymerization degree of the polymer.

In the second-stage polymerization step, it is preferable that the polymerization reaction is continued in a phase-separated state, in which a concentrated phase of the produced polymer and a dilute phase of the produced polymer are co-present as a mixture, in the presence of a phase separating agent (polymerization aid) in the polymerization reaction system.

In the second-stage polymerization step, it is particularly preferable that water is used as a phase separating agent. The amount of water in the polymerization reaction system is controlled to have a state in which water is present in an amount of greater than 2.0 mol and 10 mol or less, preferably greater than 2.0 mol and 9 mol or less, still more preferably 2.1 mol to 8 mol, and particularly preferably 2.2 mol to 7 mol per 1 mol of the charged sulfur source. For the second-stage polymerization step, when the amount of water coexisted in the polymerization reaction system is 2.0 mol or less or greater than 10 mol per 1 mol of the charged sulfur source, polymerization degree of the produced PAS may be lowered. Especially, when the second-stage polymerization is performed with the coexisted water amount in the range of 2.2 to 7 mol, PAS with high polymerization degree can be easily obtained, and therefore desirable. In addition, at least one phase separating agent that is selected from the group consisting of metal salts of organic carboxylic acids, metal salts of organic sulfonic acids, alkali metal halides, alkali earth metal halides, alkali earth metal salts of aromatic carboxylic acid, alkali metal salts of phosphoric acid, alcohols, and paraffinic hydrocarbons may be also included in a range of 0.01 to 3 mol per 1 mol of the charged sulfur source.

For the second-stage polymerization step, the polymerization temperature is in the range of 245 to 290° C. When the polymerization temperature is lower than 245° C., it is difficult to obtain PAS with high polymerization degree. On the other hand, when it is greater than 290° C., the produced PAS or organic amide solvent may decompose. The temperature range of 250 to 270° C. is particularly preferable in that the PAS with high polymerization degree can be easily obtained.

According to more preferred production process of the invention, in order to perform the polymerization with a small amount of a phase separating agent, water and a phase separating agent other than water may be used in combination as a phase separating agent. According to this embodiment of the invention, it is preferable that the amount of water in the reaction system is controlled such that it is present in an amount of 0.1 to 10 mol, preferably 0.3 to 10 mol, more preferably 0.4 to 9 mol, and particularly preferably 0.5 to 8 mol per 1 mol of the charged sulfur source and also the phase separating agent other than water is present in a range of 0.01 to 3 mol per 1 mol of the charged sulfur source. Examples of the phase separating agent other than water which is used for the second-stage polymerization step can be selected from metal salts of organic carboxylic acids, metal salts of organic sulfonic acids, alkali metal halides such as lithium halide, alkali earth metal halides, alkali earth metal salts of aromatic carboxylic acid, alkali metal salts of phosphoric acid, alcohols, and paraffinic hydrocarbons. Examples of the other phase separating agent which is particularly preferably used in combination with water include metal salts of organic carboxylic acid, especially alkali metal carboxylate. For a case in which metal salts of organic carboxylic acid are used, water may be used in a range of 0.5 to 10 mol, preferably 0.6 to 7 mol, and particularly preferably 0.8 to 5 mol per 1 mol of the charged sulfur source and also the metal salts of organic carboxylic acid such as alkali metal carboxylate may be used in a range of 0.001 to 0.7 mol, preferably 0.02 to 0.6 mol, and particularly preferably 0.05 to 0.5 mol.

Water may be added at a second stage of the polymerization reaction or upon completion thereof to increase the water content for the purpose of lowering the contents of alkali metal salts secondarily produced (for example, NaCl) and impurities in the produced polymer or recovering the polymer in the form of particles. The system of the polymerization reaction may be a batch system, a continuous system, or a combination of both systems. In the batch system polymerization, two or more reaction vessels may be used for the purpose of shortening the polymerization cycle time, as desired.

10. Separation Step

In the production process according to the present invention, a separation, recovery and treatment for the PAS polymer produced after the polymerization reaction may be conducted in accordance with the same method as the step for separating the PAS polymer produced after a common polymerization reaction. As for the separation step, after completion of the polymerization reaction, a product slurry, which is a reactant liquid containing the PAS polymer produced, is cooled and separated by filtration as it is or after diluted with water or the like to separate and collect the PAS polymer produced.

Further, according to the process for production of PAS which includes the phase separating polymerization step, a particulate PAS polymer can be formed, so that the particulate PAS is preferably separated from the reaction liquid by a method of sieving the polymer by means of a screen because the polymer can be easily separated from byproducts, oligomers, and the like. Without cooling to room temperature or so, the product slurry may be subjected to sieving as it is in a high-temperature state, thereby recovering the PAS polymer.

The polymer separated liquid which contains the polymerization solvent obtained after separating the produced PAS polymer may be recovered in a recovery tank.

11. Washing Step

In order for the PAS to contain as little alkali metal salts and an oligomer as possible, the separated PAS is subjected to a washing treatment by using at least one washing liquid selected from the group consisting of water, an organic solvent, and a mixture solution of water and an organic solvent.

Preferred examples of the organic solvent used for the washing treatment include the same organic amide solvent as those used as a polymerization solvent and hydrophilic organic solvents such as ketones (for example, methyl ethyl ketone and acetone) and alcohols (for example, methanol, ethanol, and isopropanol). It may be used either singly or in any combination of two or more types. Among them, acetone is preferred in that it is excellent in the effect to remove impurities (low-molecular weight components) such as oligomer and decomposition products. Acetone is also preferred from the viewpoints of cost and safety. When a mixture of two or more organic solvents is used, it is preferable that the organic solvent includes acetone, and the organic solvent in which ratio of acetone in the organic solvent is 50% by mass or more, and preferably 70% by mass or more may be used.

As a washing liquid, a mixture solution of water and acetone is more preferably used. As a mixture solution, a mixed solution containing water in a proportion of preferably 1 to 60% by mass, more preferably 1 to 30% by mass, and particularly preferably 1 to 20% by mass is used in that the removal efficiency of the organic impurities such as oligomers and decomposition products can be improved.

The washing treatment with the washing liquid is generally performed by mixing the PAS, which has been recovered after the separation step, with the washing liquid and stirring the resultant mixture. Number of the treatment is not limited to one. It is preferably carried out one or more times. In general, it is carried out 2 to 4 times. The amount of the washing liquid used in each washing is generally 1 to 15 times, preferably 2 to 10 times, and more preferably 3 to 8 times as much as the theoretical amount of the PAS polymer (that is, amount of PAS polymer from which water or an organic solvent is removed by drying or the like). The washing time is generally 1 to 120 minutes, preferably 3 to 100 minutes, and more preferably 5 to 60 minutes. When the washing treatment is carried out by using an organic solvent, to increase efficiency for removing organic impurities after the washing treatment and to remove the inorganic salts such as NaCl, it is preferable to perform additionally the washing treatment with water one or more times.

The washing treatment is generally conducted at room temperature (10 to 40° C.). However, the washing treatment may also be conducted at a temperature lower or higher than that temperature so far as the washing liquid is in a liquid state. For example, it may be preferable to use hot water as the washing liquid for the purpose of enhancing the washing ability of water.

In addition to the washing treatment by using at least one washing liquid selected from the group consisting of water, an organic solvent, and a mixture solution of water and an organic solvent, an acid washing for stabilizing the terminal group of PAS by using an aqueous solution of inorganic acid (for example, hydrochloric acid), organic acid (for example, acetic acid), and salts thereof (for example, ammonium chloride) can be performed either before or after the washing treatment.

12. Recovery Step for Produced Polymer and Washing Liquid

The washed polymer is separated from the washing liquid by means of a screen, centrifugal separator, or the like. When the filtration is conducted by means of the screen, a wet cake of PAS polymer having a liquid content of generally 30 to 75% by mass, and often 40 to 65% by mass is obtained. The centrifugal separator may be used to obtain a wet cake low in liquid content. The wet cake is further subjected to a filtration separation, with or without performing washing with water, to separate the PAS polymer which is then dried and the produced PAS polymer is recovered.

Meanwhile, the washing liquid used in the washing step and water used for washing the wet cake may be recovered as wash waste liquid in a recovery tank.

13. Separated Liquid Treatment Step

According to the invention, a step of treating separated liquid by which the separated liquid containing wash waste liquid obtained after separating the polymer in the washing step is contacted with an alkali compound is carried out. Further at the case that the separated liquid additionally contains a polymer separated liquid obtained after separating the polymer in the separation step, when a step of treating separated liquid is performed, hydrogen sulfide contained in the polymer separated liquid is also removed, and as a result, an occurrence of malodor upon production and molding of PAS can be more efficiently prevented. With regard to the separated liquid or polymer separated liquid, the separated liquid containing the wash waste liquid obtained after separating the polymer in the washing step or the polymer separated liquid obtained after separating the polymer in the separating step may be subjected as it is to the treatment step. Alternatively, an organic solvent or the like that has been recovered from the separated liquid by distillation or the like may be subjected to the treatment step.

Examples of the alkali compound that is used for the step of treating the separated liquid according to the invention include a compound including alkali metal hydroxides such as lithium hydroxide, sodium hydroxide, potassium hydroxide, rubidium hydroxide, and cesium hydroxide; alkali earth metal hydroxides such as calcium hydroxide and magnesium hydroxide; ammonia; organic amine such as methyl amine, dimethyl amine, and trimethyl amine; and a mixture of two or more of them. From the viewpoint of handleability, alkali metal hydroxides are preferable. Sodium hydroxide is particularly preferable.

It is understood that, according to a contact treatment of the separated liquid by addition of sodium hydroxide, for example, hydrogen sulfide dissolved in aqueous phase in the separated liquid is removed, and as a result, the generation of the causative substance of malodor based on a reaction between hydrogen sulfide and impurities derived from an organic solvent or the byproduct is inhibited and the malodor of the separated liquid is significantly reduced. It is also understood that, even when the separated liquid containing an organic solvent or an organic amide solvent is re-used for production of PAS, an occurrence of the malodor is significantly reduced.

As for the method of performing the step for treating the separated liquid, it is only required to add an aqueous solution of an alkali compound to a separated liquid containing the wash waste liquid to have a contact between them. Examples of the method include a method of adding two liquids in a reaction vessel or a mixing vessel, a method of contacting two liquids in flow state of either counter current or the same current within a washing tower or transport line, and a method of contacting two liquids in a spray state in a reaction vessel or a mixing vessel. However, the method is not limited to them and a contact method that is known in the field may be employed. From the viewpoint of contact efficiency or simplicity of a device, a method of mixing two liquids is preferable, and it may be performed by mixing and stirring for a pre-determined time, keeping it for a pre-determined time, or carrying out the mixing and stirring and the keeping for a pre-determined time. The step for treating the separated liquid is carried out until the pH of the separated liquid is 10.6 or more, preferably 10.8 or more, more preferably 11.0 or more, still more preferably 11.1 or more, and particularly preferably 11.2 or more. Even still more preferably, it may be performed until the pH of the separated liquid is 11.3 or more, and more preferably 11.5 or more. Upper limit of the pH of the separated liquid is not particularly limited. However, when pH is more than 14.0, the alkalinity is too strong, causing a trouble in the treatment or handling following it. Thus, it is generally 13.8 or less. More preferably, it is 13.5 or less.

According to the step of treating the separated liquid, content of hydrogen sulfide in an organic solvent recovered from the separated liquid obtained after the washing step or recovery step by distillation or the like and/or hydrogen sulfide in the polymerization solvent can be reduced. For example, the concentration of the hydrogen sulfide in the recovered organic solvent and/or the polymerization solvent can be reduced to 100 ppm or less, preferably 80 ppm or less, more preferably 60 ppm or less, and still more preferably 50 ppm or less.

Consequently, a causative substance of stronger malodor, that is generated by a reaction between hydrogen sulfide and a byproduct derived from an organic solvent, can be almost completely removed.

The step for treating the separated liquid may be also performed by storing the separated liquid obtained from the separation step or the washing step in a separately prepared vessel, combining it at an appropriate moment, and carrying out the step for treating the separated liquid, and it may be also quickly performed after obtaining a separated liquid which contains the wash waste liquid obtained after separating the polymer in the washing step. Further, it may be also quickly performed by mixing the separated liquid containing the wash waste liquid and the polymer separated liquid obtained after separating the polymer in the separation step.

The use amount of the alkali compound which is used for adjusting pH value during the step for treating the separated liquid is in a range of 0.001 to 10 parts by mass, preferably 0.002 to 7 parts by mass, more preferably 0.005 to 5 parts by mass, and particularly preferably 0.01 to 3 parts by mass per 100 parts by mass of the separated liquid. Specifically, with regard to the amount of an aqueous solution of an alkali compound used for the step for treating the separated liquid, amount of an aqueous solution of an alkali compound and concentration of the alkali compound in an aqueous solution of an alkali compound are appropriately adjusted such that the concentration of the alkali compound in a mixture liquid of the separated liquid and the aqueous solution of an alkali compound is 10 to 100,000 mg/L, preferably 20 to 70,000 mg/L, more preferably 50 to 50,000 mg/L, and particularly preferably 100 to 30,000 mg/L when an aqueous solution of an alkali compound is added and mixed with a separated liquid. When the concentration of the alkali compound is too low in the mixture liquid, the contact treatment with the separated liquid cannot be achieved at sufficient level, and thus the effect of reducing malodor is not obtained. On the other hand, when the concentration of the alkali compound is too high in the mixture liquid, the effect of reducing malodor is not further improved and also a trouble may be caused during the following treatment or handling.

The concentration of the alkali compound in the aqueous solution of an alkali compound, which is used for the separated liquid treatment step, is not specifically limited. However, an aqueous solution of an alkali compound in a range of 5 to 45% by mass, preferably 10 to 40% by mass, more preferably 15 to 35% by mass, and particularly preferably 20 to 30% by mass is used. When the concentration of the alkali compound is too low, the effect of reducing malodor is not obtained at sufficient level, and thus the amount of the aqueous solution of an alkali compound added to the separated liquid is increased. As a result, there is a problem in that a large vessel is required for the treatment, or the like. On the other hand, when the concentration of the alkali compound is too high, the effect of reducing malodor is not improved further, and fine adjustment of addition amount of the aqueous solution of an alkali compound, which is needed for adjusting the concentration of the alkali compound to the aforementioned level in the mixture liquid with a separated liquid, is difficult to achieve. Further, when the aqueous solution of an alkali compound is an aqueous solution of sodium hydroxide, an aqueous solution in a range of 18 to 33% by mass, and preferably 22 to 31% by mass may be used.

Temperature for the step of treating the separated liquid is, although not specifically limited, preferably room temperature (10 to 40° C.).

Time for the step of treating the separated liquid is from 1 min to 3 hours at most. When the treatment time is too short, the effect of reducing malodor is insufficient. On the other hand, when the treatment time is too long, no increase in the effect of reducing malodor is obtained. For such reasons, the treatment time of from 3 min to 2 hours is preferable. Treatment time of from 5 min to 1 hour is particularly preferable.

The separated liquid is subjected to distillation or the like and an organic solvent or an organic amide solvent or the like is recovered and reused for production of PAS. The recovery of an organic solvent or an organic amide solvent from the separated liquid by distillation or the like may be performed after the step for treating the separated liquid. Alternatively, the recovery may be performed by carrying out the distillation simultaneously with the step for treating the separated liquid. The distillation may be conducted by any one of a batch system, a fractionation system, and a continuous system.

13. Poly(Arylene Sulfide)

The PAS obtained according to the process for producing PAS of the invention contains a very small content of malodor components.

According to the process for producing PAS of the invention, PAS having a melt viscosity of generally 1 Pa·s or more, preferably 2 to 2,000 Pa·s, more preferably 2.5 to 1,500 Pa·s, and particularly preferably 3 to 1,200 Pa·s as measured under conditions of a temperature of 310° C. and a shear rate of 1,216 sec$^{-1}$ can be obtained. According to the process for production of PAS of the invention, PAS having weight average molecular weight of generally 10,000 or more, preferably 12,000 to 500,000, more preferably 13,000 to 300,000, and particularly preferably 14,000 to 200,000 can be obtained.

According to the process for production of PAS of the invention, the particulate polymer which has been collected with a screen having opening of 150 μm (100 mesh) followed by drying can be collected with yield of 80 to 98%, preferably 83 to 97%, and particularly preferably 85 to 95%. According to the production process of the invention, the particulate polymer having average particle diameter (measured by a dry sieving method (based on JIS K0069 3.1)) of 50 to 2,000 μm, preferably 60 to 1,800 μm, more preferably 70 to 1,700 μm, and particularly preferably 150 to 1,500 μm can be obtained. Further, according to the production process of the invention, the particulate PAS having specific surface area of 0.1 to 500 m$^2$/g, preferably 1 to 200 m$^2$/g, more preferably 2 to 150 m$^2$/g, and particularly preferably 3 to 100 m$^2$/g can be obtained, as measured by nitrogen adsorption-based BET method. As a result, particulate PAS in granulated state having excellent handleability can be obtained.

EXAMPLES

The present invention will herein below be described more specifically by the following Reference Examples, Examples, and Comparative Examples. However, the present invention is not limited to these examples. Measuring methods and evaluating methods of physical properties and properties are as follows.

(Measurement of Malodor Index)

For measurement of malodor index, the sample was placed in a tedlar bag and filled with 2 L of nitrogen gas, and the measurement was made by using an odor analyzer (FF-2A) manufactured by Shimadzu Corporation to obtain the malodor index. For measurement of PAS malodor, 1 g of the sample PAS particles (1 mL of acetone for the Control Example) was placed in a tedlar bag and filled with 2 L of nitrogen gas, and the measurement was made by using the odor analyzer to obtain PAS malodor index.

Measurement: Sequence for analysis with absolute value expression software (ASmell2)

Condition: Measurement condition for ASmell2 analysis as illustrated in the following Table 1 was adopted.

TABLE 1

| Step for measurement | Condition | Setting value |
|---|---|---|
| Sampling | Inhaled gas amount | 165 mL/min |
|  | Time | 6 sec |
| Purge | Temperature of collecting tube | 40° C. |
|  | Time | 30 sec |
| Emanation by heating | Temperature range of collecting tube | 40 to 220° C. |
|  | Time | 120 sec |

(Measurement of Malodor Components in Recovered Acetone)

Measurement of malodor components of the acetone recovered from the wash waste liquid (recovered acetone) was performed by gas chromatography analysis (FID) after direct injection of the recovered acetone to the device. Measurement condition for gas chromatography (herein below, referred to as "GC") is described below.

<Condition for GC>
Device: GC-3500, manufactured by Hitachi, Ltd.
Detector: FID (temperature: 230° C.)
Column: DB-WAX 15 m×0.53 mmφ (membrane thickness: 1.0 μm) manufactured by Agilent Technologies
Carrier gas: He
Sample: 2 μL, injection (Measurement of Hydrogen Sulfide Content in Recovered Acetone)

Measurement of hydrogen sulfide content in the recovered acetone was performed by gas chromatography analysis (FPD) after direct injection of the recovered acetone to the device. Measurement condition for GC is described below.

<Condition for GC>
Device: GC-263-70, manufactured by Hitachi, Ltd.
Detector: FPD (temperature: 150° C.)
Column: 25% β,β' ODPN, Uniport HP 60/80 mesh, Glass 3m, manufactured by GL Sciences Inc.
Column temperature: 70° C.
Carrier gas: nitrogen 40 mL/min
Sample: 1 μL injection Reference Example Preparation of PPS (Dehydration Step)

To a reaction vessel, 1,300 g of NMP was added. After heating to 150° C., 300 g of sodium hydrogen sulfide with concentration of 64% by mass (3.42 mol in terms of NaSH) and 185 g of sodium hydroxide with concentration of 75% by mass (3.47 mol) were added and then the dehydration step was performed by heating until the temperature inside the reaction vessel reaches 200° C. The amount of hydrogen sulfide volatilized during the dehydration step was 2 g (0.06 mol). Based on the value, amount of the sulfur source in the reaction vessel (charged sulfur source) was calculated to be 3.36 mol.

(Polymerization Step)

To the reaction vessel, 500 g (3.40 mol) of para-dichlorobenzene (herein below, abbreviated as "pDCB") was added (pDCB/sulfur source (molar ratio)=1.012), and the reaction was carried out for 5 hours after raising the temperature to 220° C.(conversion rate of pDCB; 95%. Subsequently, 100 g of water was added to the reaction vessel and the reaction was carried out for 5 hours after raising the temperature to 260° C. Once the polymerization reaction was completed, the reaction vessel was cooled to near room temperature to obtain a reaction solution containing the reaction product in slurry state.

(Separation Step)

The reaction solution was sifted through a screen with opening of 150 μm (100 mesh) to separate the wet cake containing the particulate polymer on the screen from the components which passed through the screen.

(Washing Step)

The wet cake was brought into contact with acetone under stirring for 10 min at room temperature, in which the acetone is present in a mass five times that of the polymer. After that, it was sifted through a screen with opening of 150 μm to separate the polymer components remained on the screen from the components which passed through the screen. The polymer components remained on the screen were again subjected to the washing step. Entire volume of the wash waste liquid (A) which passed through the screen was collected.

The polymer components remained on the screen were brought into contact with ion exchange water under stirring for 10 min at room temperature, in which the ion exchange water is present in a mass five times that of the polymer. After that, it was sifted through a screen with opening of 150 μm to recover the polymer components remained on the screen. The same procedure was repeated two more times. After that, the recovered polymer components which have been remained on the screen were brought into contact with 0.5% by mass aqueous solution of acetic acid for 40 min, in which the acetic acid solution was present in a mass five times that of the polymer. After that, it was sifted through a screen with opening of 150 μm to recover the polymer components remained on the screen. The polymer components remained on the screen were brought into contact with ion exchange water at temperature of 55° C. under stirring for 10 min, in which the ion exchange water is present in a mass five times that of the polymer. After that, it was sifted through a screen with opening of 150 μm to recover the polymer components remained on the screen. The same procedure was repeated to collect the polymer components that are remained on the screen followed by drying at 105° C.

(Step for Recovering Polymerization Solvent)

Regarding the sifting of a reaction liquid containing the reaction product in the separation step described above, the components which passed through the screen include NMP as a polymerization solvent and impurities like salts as a byproduct, low molecular weight PPS components, and water. To recover the NMP from these components, the components which passed through the screen were separated into a liquid component and a solid component by centrifugation (decanter). After that, the NMP was recovered by distillation from the thus-separated liquid components.

(Step for Recovering Washing Solvent)

Acetone was recovered by distillation from the wash waste liquid (A) which has been collected in the washing step described above.

Control Example 1

Malodor Index of PAS Particles Washed with Reagent Acetone:

The washing step described above was carried out by using commercially available reagent acetone (purity; 99%). After that, the PAS particles recovered after drying had malodor index of 2.0. Further, concentration of hydrogen sulfide in the reagent acetone was lower than the lower limit for quantification (0.5 ppm), and no component believed to be a malodor component was detected (not detected).

Control Example 2

Malodor Index of Reagent Acetone:

One mL of commercially available reagent acetone was added to a tedlar bag and filled with 2 L of nitrogen gas. Thereafter, the malodor index was measured using an odor analyzer, and it was found to be 29.8.

Example 1

As a separated liquid treatment step, about 2 g of aqueous sodium hydroxide solution with concentration of 25% by mass was added to 3,500 g of the wash waste liquid (A) which had been recovered by the step for recovering the washing solvent in a vessel with 5 L volume. While the mixture being stirred and mixed for 15 min, pH of the mixture was adjusted to 10.4 to 11.4 and the acetone recovery after the separated liquid treatment by using an alkaline compound was performed based on distillation. Concentration of hydrogen sulfide in the acetone obtained after the recovery treatment was 35 ppm and the total area of GC peak (retention time is in the range of 3.3 min to 3.5 min), which was an indicator of the malodor components, was 97. By re-using the recovered acetone after the treatment, the washing step described above was performed followed by drying. The resulting PPS was the particles which have average particle diameter of 760 μam, specific surface area of 42 m$^2$/g, and malodor index of 3.1.

Example 2

Acetone recovery after the separated liquid treatment by using an alkaline compound was performed based on distillation in the same manner as the Example 1 except that, as a separated liquid treatment step, an aqueous solution of sodium hydroxide with concentration of 25% by mass was added to the wash waste liquid (A) which had been recovered by the step for recovering the washing solvent, and pH of the mixture was adjusted to 12.0 while the mixture being stirred and mixed for 15 min Concentration of hydrogen sulfide in the acetone obtained after the recovery treatment was lower than the lower limit for quantification (0.5 ppm), and no component believed to be a malodor component was detected. The resulting PPS which was obtained by the washing step reusing the recovered acetone followed by drying is in particulate state which had the same average particle diameter and specific surface area as that of the Example 1. The malodor index was 2.2, which was almost equivalent to the malodor index of the PPS particles of the Control Example 1 that were obtained by the washing step using the reagent acetone.

Comparative Example

Acetone recovery was performed based on distillation in the same manner as the Example 1 except that pH adjustment of the wash waste liquid (A) by addition of sodium hydroxide was not carried out (pH was 10.4). As a result, concentration of hydrogen sulfide in the acetone, which had been recovered without performing the separated liquid treatment step (recovered acetone), was 270 ppm and the total area of GC peak (retention time is in the range of 3.3 min to 3.5 min), which was an indicator of the malodor components, was 340. The recovered acetone (1 mL) was added as it was to a tedlar bag and filled with 2 L of nitrogen gas. Result of measuring malodor index by using an odor analyzer was 41.0.

By using the recovered acetone, the washing step was performed followed by drying. The resulting PPS particles had malodor index of 8.2.

Results of the Examples 1 and 2 and the Comparative Example are listed in Table 2 with the results of the Control Example 1.

TABLE 2

| | Concentration of hydrogen sulfide in acetone (ppm) | Total GC area of malodor components in acetone | Malodor index of PPS particles |
|---|---|---|---|
| Example 1 | 35 | 97 | 3.1 |
| Example 2 | Lower than lower quantification limit | Not detected | 2.2 |
| Comparative Example | 270 | 340 | 8.2 |
| Control Example | Lower than lower quantification limit | Not detected | 2.0 |

From the comparison of the Examples and the Comparative example, it was found that PPS particles with reduced malodor were obtained by the PAS production process of the invention. Further, the separated liquid containing the wash waste liquid which was obtained by PAS production process of the invention has reduced malodor as it was obtained after a contact treatment with an alkaline compound. Since the malodor of the PPS particles was directly proportional to the malodor during molding process, it is found that reducing the malodor which occurs during the molding process can be achieved by performing the separated liquid treatment step of the invention.

INDUSTRIAL APPLICABILITY

According to the process for producing poly(arylene sulfide) of the invention, malodor of a separated liquid which consists of a polymer separated liquid obtained after separating PAS from a reaction liquid containing the produced polymer or a wash waste liquid obtained after washing PAS with an organic solvent can be reduced. As a result, an enormous effort required for a deodorizing treatment of the separated liquid is unnecessary and an occurrence of malodor during production and molding of PAS is inhibited. Accordingly, reuse of an organic solvent or the like is promoted and a contribution to solving the problems associated with resources and environment is possible, and therefore it has remarkable industrial usefulness.

The invention claimed is:
1. A process for producing poly(arylene sulfide), the process comprising:
a polymerization step of polymerizing a dihalogenated aromatic compound and at least one sulfur source selected from the group consisting of alkali metal sulfides and alkali metal hydrogen sulfides in an organic amide solvent to produce a polymer;
a separation step of separating and recovering polymer from a reaction liquid containing the produced polymer after the polymerization step;
a washing step of washing the recovered polymer with at least one washing liquid selected from the group consisting of water, an organic solvent, and a mixture solution of water and an organic solvent, wherein the organic solvent comprises acetone; and
a separated liquid treatment step of bringing a separated liquid containing a wash waste liquid obtained after separating the polymer in the washing step and a polymer-separated liquid obtained after separating the polymer in the separation step into contact with an alkaline compound, wherein the step for treating the separated liquid is carried out until the pH of the separated liquid is in the range of 10.6 to 13.8, and wherein the separated liquid after the separated liquid treatment step is subjected to distillation and an organic solvent and/or an organic amide solvent is recovered and reused for the process for producing poly(arylene sulfide).

2. The process for producing poly(arylene sulfide) according to claim 1, wherein the alkaline compound is alkali metal hydroxide.

3. The process for the production of poly(arylene sulfide) according to claim 2, wherein the alkali metal hydroxide is sodium hydroxide.

4. The process for producing poly(arylene sulfide) according to claim 1, wherein the amount of the alkaline compound used is 0.001 to 10 parts by mass per 100 parts by mass of the separated liquid.

5. The process for producing poly(arylene sulfide) according to claim 1, wherein the polymerization step is a polymerization reaction of at least one sulfur source selected from the group consisting of the alkali metal sulfides and the alkali metal hydrogen sulfides with the dihalogenated aromatic compound in the organic amide solvent at the temperature of 170 to 290° C. in the presence of a phase separating agent.

6. The process for producing poly(arylene sulfide) according to claim 5, wherein the phase separating agent is at least one selected from the group consisting of water, metal salts of organic carboxylic acids, metal salts of organic sulfonic acids, alkali metal halides, alkali earth metal halides, alkali earth metal salts of aromatic carboxylic acid, alkali metal salts of phosphoric acid, alcohols, and paraffinic hydrocarbons.

7. The process for producing poly(arylene sulfide) according to claim 6, wherein the phase separating agent is 0.5 to 10 mol of water and 0.001 to 0.7 mol of metal salts of organic carboxylic acid per 1 mol of the charged sulfur source.

8. The process for producing poly(arylene sulfide) according to claim 1, wherein the polymerization step is a polymerization reaction of at least one sulfur source selected from the group consisting of the alkali metal sulfides and the alkali metal hydrogen sulfides with the dihalogenated aromatic compound in the organic amide solvent at the temperature of 170 to 270° C., and at the point of time, in which the conversion rate of the dihalogenated aromatic compound has reached 30% or more, the phase separating agent is included in the polymerization reaction system and the polymerization reaction is further continued at the temperature of 245 to 290° C.

9. The process for producing poly(arylene sulfide) according to claim 1, wherein the polymerization step is a polymerization process with at least two stages which comprises:

first-stage polymerization step by which at least one sulfur source selected from the group consisting of the alkali metal sulfides and the alkali metal hydrogen sulfides is subjected to the polymerization reaction with the dihalogenated aromatic compound in the organic amide solvent to produce a polymer in which conversion rate of the dihalogenated aromatic compound is 80 to 99%; and second-stage polymerization step by which the polymerization reaction is continued in a phase-separated state, wherein a concentrated phase of the produced polymer and a dilute phase of the produced polymer are co-present as a mixture, in the presence of a phase separating agent in the polymerization reaction system.

10. The process for producing poly(arylene sulfide) according to claim 1, wherein the polymerization step is a polymerization process with at least two stages which comprises:

first-stage polymerization step by which at least one sulfur source selected from the group consisting of the alkali metal sulfides and the alkali metal hydrogen sulfides is subjected to the polymerization reaction with the dihalogenated aromatic compound in the organic amide solvent at the temperature of 170 to 270° C. in the presence of water in an amount of 0.02 to 2.0mol per 1 mol of the charged sulfur source to produce a polymer in which conversion rate of the dihalogenated aromatic compound is 80 to 99%; and second-stage polymerization step by which water content in the polymerization reaction system is controlled such that water is present in an amount of greater than 2.0 mol and 10 mol or less per 1 mol of the charged sulfur source and at the temperature of 245 to 290° C., the polymerization reaction is continued in a phase-separated state, wherein a concentrated phase of the produced polymer and a dilute phase of the produced polymer are co-present as a mixture in the polymerization reaction system.

11. The process for producing poly(arylene sulfide) according to claim 10, wherein in the second-stage polymerization step, water content in the polymerization reaction system is controlled such that water is present in an amount of greater than 2.0 mol and 10 mol or less per 1 mol of the charged sulfur source and at least one phase separating agent that is selected from the group consisting of metal salts of organic carboxylic acids, metal salts of organic sulfonic acids, alkali metal halides, alkali earth metal halides, alkali earth metal salts of aromatic carboxylic acid, alkali metal salts of phosphoric acid, alcohols, and paraffinic hydrocarbons is included in a range of 0.01 to 3 mol per 1 mol of the charged sulfur source.

12. The process for producing poly(arylene sulfide) according to claim 1, wherein, prior to the polymerization step, are arranged dehydration step by which a mixture including the organic amide solvent, the sulfur source containing the alkali metal hydrogen sulfide, and alkali metal hydroxide in an amount of 0.95 to 1.05 mol per 1 mol of the alkali metal hydrogen sulfide is reacted by heating and at least part of distillation extract containing water is discharged from inside of the system including the mixture to outside of the system; and charging step by which the alkali metal hydroxide and water are added, if necessary, to the mixture remained in the system after the dehydration step such that total mol number including the mol number of the alkali metal hydroxide that is produced in conjunction with hydrogen sulfide produced by dehydration, the mol number of the alkali metal hydroxide that is added before the dehydration, and the mol number of the alkali metal hydroxide that is added after the dehydration is 1.00 to 1.09 mol per 1 mol of the charged sulfur source and the mol number of water is 0.02 to 2.0 mol per 1 mol of the charged sulfur source.

* * * * *